US010164456B2

(12) United States Patent
Luo et al.

(10) Patent No.: US 10,164,456 B2
(45) Date of Patent: Dec. 25, 2018

(54) METHOD FOR CHARGING A LITHIUM ION BATTERY

(71) Applicants: Dongguan Amperex Technology Limited, Dongguan, Guangdong (CN); Ningde Amperex Technology Limited, Ningde, Fujian (CN)

(72) Inventors: Fuping Luo, Fujian (CN); Shengwei Wang, Fujian (CN); Chao Gao, Fujian (CN); Qiang Zheng, Fujian (CN)

(73) Assignees: Dongguan Amperex Technology Limited, Dongguan (CN); Ningde Amperex Technology Limited, Ningde (CN)

( * ) Notice: Subject to any disclaimer, the term of this patent is extended or adjusted under 35 U.S.C. 154(b) by 116 days.

(21) Appl. No.: 15/439,867

(22) Filed: Feb. 22, 2017

(65) Prior Publication Data

US 2017/0244255 A1 Aug. 24, 2017

(30) Foreign Application Priority Data

Feb. 23, 2016 (CN) ......................... 2016 1 0099461

(51) Int. Cl.

| | |
|---|---|
| ***H02J 7/00*** | (2006.01) |
| ***H01M 10/44*** | (2006.01) |
| ***H01M 10/0525*** | (2010.01) |
| ***H01M 4/587*** | (2010.01) |
| *H01M 4/505* | (2010.01) |
| *H01M 4/525* | (2010.01) |
| *H01M 4/58* | (2010.01) |

(52) U.S. Cl.

CPC ............ *H02J 7/007* (2013.01); *H01M 4/587* (2013.01); *H01M 10/0525* (2013.01); *H01M 10/44* (2013.01); *H02J 7/008* (2013.01); *H01M 4/505* (2013.01); *H01M 4/525* (2013.01); *H01M 4/5825* (2013.01)

(58) Field of Classification Search

CPC ....................................................... H02J 7/007
USPC ......................................................... 320/132
See application file for complete search history.

(56) References Cited

U.S. PATENT DOCUMENTS 5,550,454 A * 8/1996 Buckley ................ H01M 10/44
320/160
6,104,165 A * 8/2000 Miyamoto ............ H01M 10/44
320/125

(Continued)

*Primary Examiner* — Yalkew Fantu

(57) ABSTRACT

A method for charging a lithium ion battery includes the steps of: 1) determining a maximum charging current $I_0$ and a lowest anode potential η of the lithium ion battery at which no lithium precipitation occurs; 2) charging the lithium ion battery at a constant current of $I_1$ which is greater than $I_0$ for a charging time $t_1$; 3) discharging the lithium ion battery at a constant current of $I_2$ which is less than $I_0$ for a discharging time $t_2$, $5 \le t_1/t_2 \le 50$; 4) repeating steps 2) and 3) until a cutoff voltage of the lithium ion battery reaches $V_0$ and standing the lithium ion battery for a standing time $t_3$; and 5) charging the lithium ion battery at a constant current of $I_0$ until the cutoff voltage of the lithium ion battery reaches $V_0$ and charging the lithium ion battery to a cutoff current of $I_3$ at a constant voltage.

8 Claims, 3 Drawing Sheets

(56) References Cited

U.S. PATENT DOCUMENTS

| | | | | |
|---|---|---|---|---|
| 2001/0022518 | A1* | 9/2001 | Asakura | G01R 31/3679 324/426 |
| 2005/0001593 | A1* | 1/2005 | Kawasumi | H02J 7/0013 320/132 |
| 2005/0264263 | A1* | 12/2005 | Tsenter | H02J 7/0072 320/128 |
| 2006/0208701 | A1* | 9/2006 | Mikhaylik | H01M 4/5815 320/128 |

* cited by examiner

METHOD FOR CHARGING A LITHIUM ION BATTERY

CROSS-REFERENCE TO RELATED APPLICATION

The present patent application claims priority to Chinese patent application number CN 201610099461.8 filed on Feb. 23, 2016, which is incorporated by reference herein in its entirety.

FIELD OF THE INVENTION

The present invention generally relates to lithium ion batteries and, more particularly, relates to method for charging a lithium ion battery which can inhibit lithium precipitation at the anode and improve the safety performance and cycle life of the lithium ion battery.

BACKGROUND OF THE INVENTION

After 20 years of development, energy density of a lithium ion battery has been significantly improved. At present, the energy density of a lithium ion battery has been developed to a bottleneck stage. Increasing the charging speed of a lithium ion battery with limited energy density can enhance user's experience. Therefore, lithium ion battery having high energy density which can be charged quickly will stand out in the future competition.

In charging process of a lithium ion battery, lithium precipitation only occurs at the anode when the anode potential is reduced to a certain over potential for a certain period of time. This potential is the lowest anode potential of at which no lithium precipitation at the anode, usually expressed by $\eta$. The existing method for charging a lithium ion battery usually includes charging the lithium ion battery at a constant current to a potential and then charging the lithium ion battery at a constant voltage at this potential. The existing method for charging a lithium ion battery may lead to increase of the cathode potential of the lithium ion battery and reduce of the anode potential of the lithium ion battery. When the anode potential is below 0V, the lithium ion will be reduced to lithium via precipitation at the surface of the anode. Especially in low temperature conditions, due to the decline of ion and electronic conductivity of the lithium ion battery, the charging process will cause increased polarization. A continuous charging will make the polarization more obvious and increase the possibility of lithium precipitation. The precipitation of lithium dendrite will be accumulated in the electrode surface, which threatens to the safety performance of lithium ion battery seriously.

For a lithium ion battery, the safe charging region is certain, i.e. there is a maximum rate at which no lithium precipitation occurs at the anode. When the charging rate is higher than the maximum rate, lithium precipitation occurs at the anode, thereby affecting the safety performance and service life of lithium ion battery. In order to improve charging speed of the lithium ion battery, charging method can be optimized to inhibit lithium precipitation at the at high large rate, thereby expanding its safe charging range and improving the maximum charging rate of the anode at which no lithium precipitation occurs.

In view of the foregoing, what is needed, therefore, is to provide a method for charging a lithium ion battery which can inhibit lithium precipitation at the anode, so as to improve safe charging rate, safety performance and cycle life of the lithium ion battery.

SUMMARY OF THE INVENTION

One object of the present invention is to provide a method for charging a lithium ion battery which can inhibit lithium precipitation at the anode, so as to improve safe charging rate, safety performance and cycle life of the lithium ion battery.

According to one embodiment of the present invention, a method for charging a lithium ion battery, including the steps of:

1) determining a maximum charging current $I_0$ and a lowest anode potential $\eta$ of the lithium ion battery at which no lithium precipitation occurs;

2) charging the lithium ion battery at a constant current of $I_1$ which is greater than $I_0$ for a charging time of $t_1$;

3) discharging the lithium ion battery at a constant current of $I_2$ which is less than $I_0$ for a discharging time of $t_2$, wherein $5 \leq t_1/t_2 \leq 50$;

4) repeating steps 2) and 3) until a cutoff voltage of the lithium ion battery reaches $V_0$, and then standing the lithium ion battery for a standing time of $t_3$; and 5) charging the lithium ion battery with a constant current of $I_0$ until the cutoff voltage of the lithium ion battery reaches $V_0$ and then charging the lithium ion battery to a cutoff current of $I_3$ at a constant voltage.

According to one aspect of the present invention, in step 2), a current value of the constant current $I_1$ is 0.7 C to 3 C and the charging time $t_1$ is 0.1 s to 20 s.

According to one aspect of the present invention, in step 3), a current value of the constant current $I_2$ is 0 to 0.2 C and the discharging time $t_2$ is 0.01 s to 2 s.

According to one aspect of the present invention, in step 4), the standing time $t_3$ is 1 s to 10 s.

According to one aspect of the present invention, in step 5), a current value of the constant current $I_3$ is 0.01 C to 0.1 C.

According to one aspect of the present invention, the cutoff voltage $V_0$ satisfies $3.6V \leq V_0 < 4.5V$.

According to one aspect of the present invention, a cathode of the lithium ion battery is selected from a group consisting of $LiCoO_2$, $LiFePO_4$, $LiNiCoMn_xAl_{1-x}O_2$ ($0 \leq x \leq 1$, hereinafter referred to as NCX (X=Mn, Al)); an anode of the lithium ion battery is selected from a group consisting of graphite, hard carbon, mesophase carbon microbeads; a maximum charge current $I_0$ of the anode at which no lithium precipitation occurs at the anode is 0.5 C to 2.0 C; and a lowest anode potential $\eta$ at which no lithium precipitation occurs at the anode is −5 mV to −100 mV.

According to one aspect of the present invention, the method is carried out at a temperature of 25±3° C.

Compared with the prior art, the method for charging a lithium ion battery of the present invention has the following advantages: the lithium ion battery is charged with a wide large current pulse and then discharged with a narrow small current pulse. The time in which the battery is below the lowest anode potential $\eta$ when charged with high current is remarkably shortened. Increase of lithium ion concentration at the surface of the anode caused by the large current is reduced. Time in which the anode is at low potential is reduced, so as to avoid the safe problem caused by lithium precipitation at the anode.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention.

DETAILED DESCRIPTION OF THE INVENTION

Figure 1:
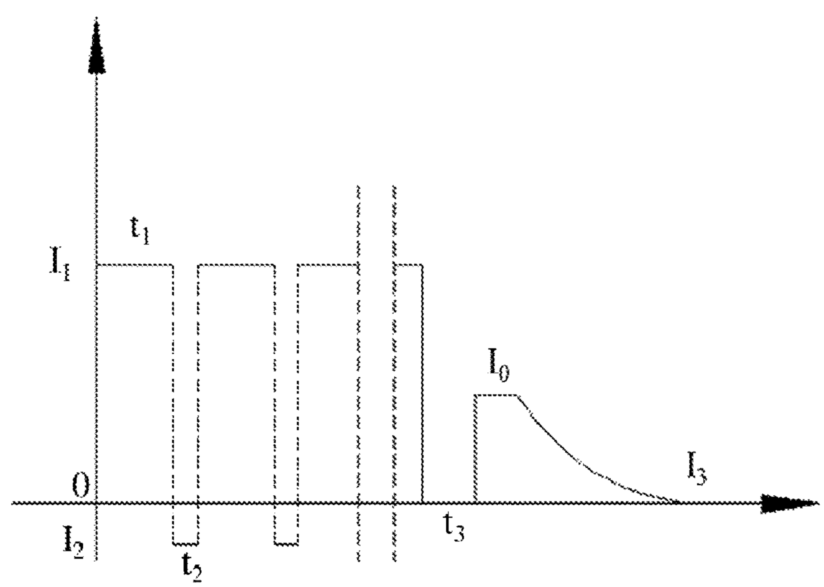
FIG. 1 depicts a schematic diagram of a charging scheme according to a method for charging a lithium ion battery of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The lithium ion batteries of Examples 1 to 7 and Comparative examples 1 to 2 each has a cathode of $LiCoO_2$ and an anode of graphite. Each lithium ion battery also includes a separator, an electrolyte and a packaging case. Each lithium ion battery is prepared by assembling, forming and aging process. The cathode includes 96.7% of $LiCoO_2$ (as a cathode active material), 1.7% of PVDF (as a binder), and 1.6% of SP (as a conductive agent). The anode includes 98% of artificial graphite (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3400 mAh (0.2 C) and the cutoff voltage $V_0$ is 4.4V. At 25° C., the maximum charge current of the anode at which no lithium precipitation occurs is 1.3 C and the lowest anode potential of the anode at which no lithium precipitation occurs is −70 mV.

EXAMPLE 1

Figure 3:
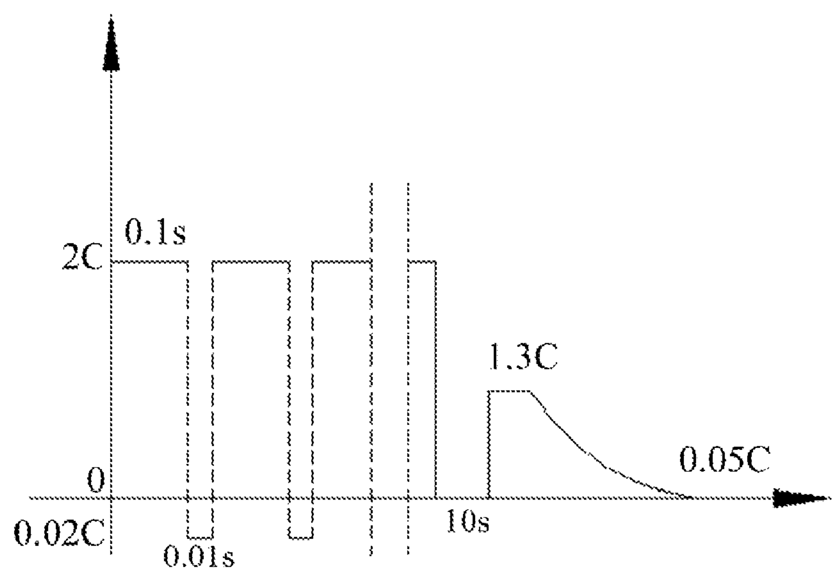
FIG. 3 depicts a schematic diagram of a charging process of example 1 of the present invention.

A lithium ion battery is charged at 25° C. according to the method for charging a lithium ion battery of the present invention. As shown in FIGS. 1 and 3, the method for charging a lithium ion battery including the steps of:

1) charging the lithium ion battery at a constant current of 2 C for 0.1 s;

2) discharging the lithium ion battery at a constant current of 0.02 C for 0.01 s;

3) repeating steps 1) and 2) until a cutoff voltage of the lithium ion battery reaches 4.4V and then standing the lithium ion battery for 10 s; and 4) charging the lithium ion battery at a constant current of 1.3 C until the cutoff voltage reaches 4.4V and then charging the lithium ion battery at a constant voltage until a cutoff current of 0.05 C is reached.

EXAMPLE 2

A lithium ion battery is charged at 25° C. according to the method for charging a lithium ion battery of the present invention. The method for charging a lithium ion battery including the steps of:

1) charging the lithium ion battery at a constant current of 1.5 C for 10 s;

2) discharging the lithium ion battery at a constant current of 0.1 C for 0.2 s;

3) repeating steps 1) and 2) until a cutoff voltage of the lithium ion battery reaches 4.4V and then standing the lithium ion battery for 10 s; and 4) charging the lithium ion battery at a constant current of 1.3 C until the cutoff voltage reaches 4.4V and then charging the lithium ion battery at a constant voltage until a cutoff current of 0.05 C is reached.

EXAMPLE 3

A lithium ion battery is charged at 25° C. according to the method for charging a lithium ion battery of the present invention. The method for charging a lithium ion battery including the steps of:

1) charging the lithium ion battery at a constant current of 1.5 C for 2 s;

2) discharging the lithium ion battery at a constant current of 0.2 C for 0.05 s;

3) repeating steps 1) and 2) until a cutoff voltage of the lithium ion battery reaches 4.4V and then standing the lithium ion battery for 10 s; and 4) charging the lithium ion battery at a constant current of 1.3 C until the cutoff voltage reaches 4.4V and then charging the lithium ion battery at a constant voltage until a cutoff current of 0.05 C is reached.

EXAMPLE 4

A lithium ion battery is charged at 25° C. according to the method for charging a lithium ion battery of the present invention. The method for charging a lithium ion battery including the steps of:

1) charging the lithium ion battery at a constant current of 1.5 C for 20 s;

2) discharging the lithium ion battery at a constant current of 0.1 C for 2 s;

3) repeating steps 1) and 2) until a cutoff voltage of the lithium ion battery reaches 4.4V and then standing the lithium ion battery for 10 s; and 4) charging the lithium ion battery at a constant current of 1.3 C until the cutoff voltage reaches 4.4V and then charging the lithium ion battery at a constant voltage until a cutoff current of 0.05 C is reached.

EXAMPLE 5

A lithium ion battery is charged at 25° C. according to the method for charging a lithium ion battery of the present invention. The method for charging a lithium ion battery including the steps of:

1) charging the lithium ion battery at a constant current of 2 C for 1 s;

2) discharging the lithium ion battery at a constant current of 0.01 C for 0.1 s;

3) repeating steps 1) and 2) until a cutoff voltage of the lithium ion battery reaches 4.4V and then standing the lithium ion battery for 10 s; and 4) charging the lithium ion battery at a constant current of 1.3 C until the cutoff voltage reaches 4.4V and then charging the lithium ion battery at a constant voltage to a cutoff current of 0.01 C.

EXAMPLE 6

A lithium ion battery is charged at 25° C. according to the method for charging a lithium ion battery of the present invention. The method for charging a lithium ion battery including the steps of:

1) charging the lithium ion battery at a constant current of 2 C for 5 s;

2) discharging the lithium ion battery at a constant current of $I_2$=0 for 1 s;

3) repeating steps 1) and 2) until a cutoff voltage of the lithium ion battery reaches 4.4V and then standing the lithium ion battery for 1 s; and 4) charging the lithium ion battery at a constant current of 1.3 C until the cutoff voltage reaches 4.4V and then charging the lithium ion battery at a constant voltage to a cutoff current of 0.1 C.

EXAMPLE 7

A lithium ion battery is charged at 25° C. according to the method for charging a lithium ion battery of the present invention. The method for charging a lithium ion battery including the steps of:

1) charging the lithium ion battery at a constant current of 2 C for 3 s;

2) discharging the lithium ion battery at a constant current of 0.1 C for 0.5 s;

3) repeating steps 1) and 2) until a cutoff voltage of the lithium ion battery reaches 4.4V and then standing the lithium ion battery for 30 s; and 4) charging the lithium ion battery at a constant current of 1.3 C until the cutoff voltage reaches 4.4V and then charging the lithium ion battery at a constant voltage to a cutoff current of 0.05 C.

COMPARATIVE EXAMPLE 1

Figure 4:
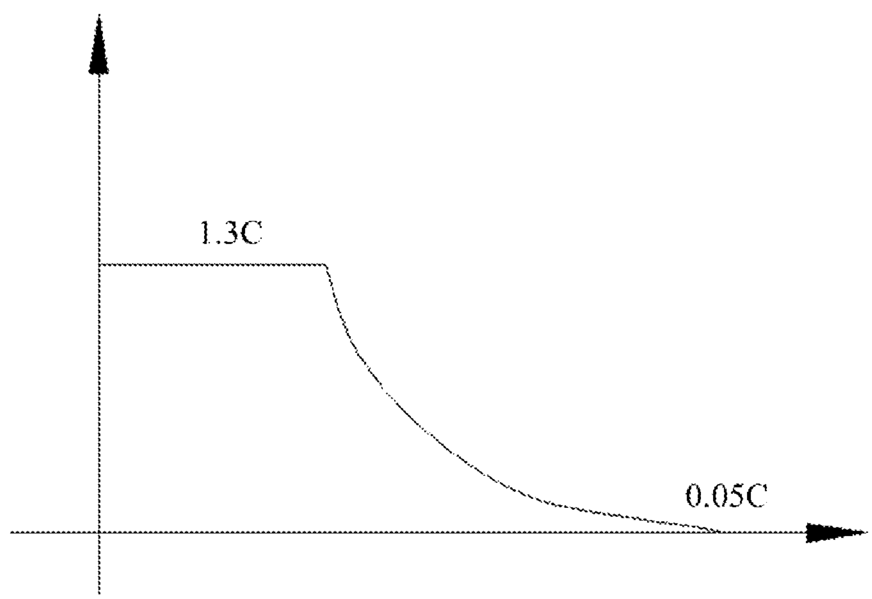
FIG. 4 depicts a schematic diagram of a charging process of comparative example 1.

A lithium ion battery is charged at 25° C. according to a conventional method for charging a lithium ion battery. As shown in FIG. 4, the conventional method for charging a lithium ion battery including the steps of:

1) charging the lithium ion battery at a constant current of 1.3 C until a cutoff voltage of 4.4V; and 2) charging the lithium ion battery at a constant voltage until a cutoff current of 0.05 C.

COMPARATIVE EXAMPLE 2

A lithium ion battery is charged at 25° C. according to a conventional method for charging a lithium ion battery. The conventional method for charging a lithium ion battery including the steps of:

1) charging the lithium ion battery at a constant current of 1.8 C until a cutoff voltage of 4.4V; and 2) charging the lithium ion battery at a constant voltage until a cutoff current of 0.05 C.

Table 1 presents comparison of charging parameters, lithium precipitation and charging time of lithium ion batteries including $LiCoO_2$ and graphite in Examples 1 to 7 and comparative Examples 1 to 2.

TABLE 1

Comparison of charging parameters and charging effects of lithium ion batteries including $LiCoO_2$ and graphite in Examples and Comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 1 | / | / | / | / | 1.3 C | / | 0.05 C | No | 37.8 |
| Comparative example 2 | / | / | / | / | 1.8 C | / | 0.05 C | Yes | 32.7 |
| Example 1 | 2 C | 0.1 | 0.02 C | 0.01 | 1.3 C | 10 | 0.05 C | No | 32.5 |
| Example 2 | 1.5 C | 10 | 0.1 C | 0.2 | 1.3 C | 10 | 0.05 C | No | 34.2 |
| Example 3 | 1.5 C | 2 | 0.2 C | 0.05 | 1.3 C | 10 | 0.05 C | No | 33.9 |
| Example 4 | 1.5 C | 20 | 0.1 C | 2 | 1.3 C | 10 | 0.05 C | No | 34.8 |
| Example 5 | 2 C | 1 | 0.01 C | 0.1 | 1.3 C | 10 | 0.01 C | No | 32.2 |
| Example 6 | 2 C | 5 | 0 | 1 | 1.3 C | 1 | 0.1 C | No | 35.1 |
| Example 7 | 2 C | 3 | 0.1 C | 0.5 | 1.3 C | 30 | 0.05 C | No | 31.9 |

The lithium ion batteries of Examples 8 to 14 and Comparative examples 3 to 4 each has a cathode of $LiCoO_2$ and an anode of hard carbon. Each lithium ion battery also includes a separator, an electrolyte and a packaging case. Each lithium ion battery is prepared by assembling, forming and aging process. The cathode includes 96.7% of $LiCoO_2$ (as a cathode active material), 1.7% of PVDF (as a binder), and 1.6% of SP (as a conductive agent). The anode includes 98% of hard carbon (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3150 mAh (0.2 C) and the cutoff voltage $V_0$ is 4.4V. At 25° C., the maximum charge current of the anode at which no lithium precipitation occurs is 2 C, and the lowest anode potential of the anode at which no lithium precipitation occurs is −100 mV.

Examples 8 to 14 and Comparative examples 3 to 4 each is charged at 25° C. Examples 8 to 14 each use the method for charging a lithium ion battery of the present invention, and Comparative example 3 to 4 each use a conventional method for charging a lithium ion battery at a constant current and voltage. Table 2 presents the relevant parameters of each Examples and Comparative examples.

TABLE 2

Comparison of charging parameters and charging effects of lithium ion batteries including $LiCoO_2$ and hard carbon

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 3 | / | / | / | / | 2 C | / | 0.05 C | No | 31.8 |
| Comparative example 4 | / | / | / | / | 2.5 C | / | 0.05 C | Yes | 26.6 |
| Example 8 | 2.5 C | 0.1 | 0.02 C | 0.01 | 2 C | 10 | 0.05 C | No | 25.5 |
| Example 9 | 2.5 C | 10 | 0.1 C | 0.2 | 2 C | 10 | 0.05 C | No | 27.4 |
| Example 10 | 2.5 C | 2 | 0.2 C | 0.05 | 2 C | 10 | 0.05 C | No | 25.2 |
| Example 11 | 3 C | 20 | 0.1 C | 2 | 2 C | 10 | 0.05 C | No | 26.1 |
| Example 12 | 3 C | 1 | 0.01 C | 0.1 | 2 C | 10 | 0.01 C | No | 25.6 |
| Example 13 | 2.5 C | 5 | 0 | 1 | 2 C | 1 | 0.1 C | No | 28.7 |
| Example 14 | 2.5 C | 3 | 0.1 C | 0.5 | 2 C | 30 | 0.05 C | No | 26.4 |

The lithium ion batteries of Examples 15 to 21 and Comparative examples 5 to 6 each includes a cathode of $LiCoO_2$ and an anode of mesophase carbon microbeads. Each lithium ion battery also includes a separator, an electrolyte and a packaging case. Each lithium ion battery is prepared by assembling, forming and aging process. The cathode includes 96.7% of $LiCoO_2$ (as a cathode active material), 1.7% of PVDF (as a binder), and 1.6% of SP (as a conductive agent). The anode includes 98% of MCMB (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3250 mAh (0.2 C) and the cutoff voltage $V_0$ is 4.4V. At 25° C., the maximum charge current of the anode at which no lithium precipitation occurs is 1 C, and the lowest anode potential of the anode at which no lithium precipitation occurs at the anode is −50 mV.

Examples 15 to 21 and Comparative examples 5 to 6 each is charged at 25° C. Examples 15 to 21 each use the method for charging a lithium ion battery of the present invention, and Comparative example 5 to 6 each use a conventional method for charging a lithium ion battery at a constant current and voltage. Table 3 presents the relevant parameters of each Examples and Comparative examples.

TABLE 3

Comparison of charging parameters and charging effects of lithium ion batteries including $LiCoO_2$ and mesophase carbon microbeads in Examples and Comparative examples

| | $I_1$ | $t_1$(s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 5 | / | / | / | / | 1 C | / | 0.05 C | No | 48.1 |
| Comparative example 6 | / | / | / | / | 1.2 C | / | 0.05 C | Yes | 39.9 |
| Example 15 | 1.3 C | 0.1 | 0.02 C | 0.01 | 1 C | 10 | 0.05 C | No | 41.2 |
| Example 16 | 1.3 C | 10 | 0.1 C | 0.2 | 1 C | 10 | 0.05 C | No | 39.6 |
| Example 17 | 1.5 C | 2 | 0.2 C | 0.05 | 1 C | 10 | 0.05 C | No | 38.5 |
| Example 18 | 1.3 C | 20 | 0.1 C | 2 | 1 C | 10 | 0.05 C | No | 39.8 |
| Example 19 | 1.3 C | 1 | 0.01 C | 0.1 | 1 C | 10 | 0.01 C | No | 40.2 |
| Example 20 | 1.5 C | 5 | 0 | 1 | 1 C | 1 | 0.1 C | No | 41.4 |
| Example 21 | 1.5 C | 3 | 0.1 C | 0.5 | 1 C | 30 | 0.05 C | No | 39.8 |

The lithium ion batteries of Examples 22 to 28 and Comparative examples 7 to 8 each includes a cathode of $LiFePO_4$ and an anode of graphite. Each lithium ion battery also includes a separator, an electrolyte and a packaging case. Each lithium ion battery is prepared by assembling, forming and aging process. The cathode includes 95.4% of $LiFePO_4$ (as a cathode active material), 2% of PVDF (as a binder), and 2.6% of SP (as a conductive agent). The anode includes 98% of artificial graphite (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3200 mAh (0.2 C) and the cutoff voltage $V_0$ is 3.7V. At 25° C., the maximum charge current of the anode at which no lithium precipitation occurs at the anode is 0.7 C, and the lowest anode potential of the anode at which no lithium precipitation occurs at the anode is −20 mV.

Examples 22 to 28 and Comparative examples 7 to 8 each is charged at 25° C. Examples 22 to 28 each use the method for charging a lithium ion battery of the present invention, and Comparative example 7 to 8 each use a conventional method for charging a lithium ion battery at a constant current and voltage. Table 4 presents the relevant parameters of each Examples and Comparative examples.

TABLE 4

Comparison of charging parameters and charging effects of lithium ion batteries including $LiFePO_4$ and graphite in Examples and Comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 7 | / | / | / | / | 0.7 C | / | 0.05 C | No | 67.4 |
| Comparative example 8 | / | / | / | / | 1 C | / | 0.05 C | Yes | 48.2 |
| Example 22 | 1.1 C | 0.1 | 0.02 C | 0.01 | 0.7 C | 10 | 0.05 C | No | 49.3 |
| Example 23 | 1.3 C | 10 | 0.1 C | 0.2 | 0.7 C | 10 | 0.05 C | No | 47.2 |
| Example 24 | 1.1 C | 2 | 0.2 C | 0.05 | 0.7 C | 10 | 0.05 C | No | 49.6 |
| Example 25 | 1.3 C | 20 | 0.1 C | 2 | 0.7 C | 10 | 0.05 C | No | 48.5 |
| Example 26 | 1.3 C | 1 | 0.01 C | 0.1 | 0.7 C | 10 | 0.01 C | No | 46.9 |
| Example 27 | 1.1 C | 5 | 0 | 1 | 0.7 C | 1 | 0.1 C | No | 49.9 |
| Example 28 | 1.3 C | 3 | 0.1 C | 0.5 | 0.7 C | 30 | 0.05 C | No | 47.3 |

The lithium ion batteries of Examples 29 to 35 and Comparative examples 9 to 10 each includes a cathode of $LiFePO_4$ and an anode of hard carbon. Each lithium ion battery also includes a separator, an electrolyte and a packaging case. Each lithium ion battery is prepared by assembling, forming and aging process. The cathode includes 95.4% of $LiFePO_4$ (as a cathode active material), 2% of PVDF (as a binder), and 2.6% of SP (as a conductive agent). The anode includes 98% of hard carbon (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 2800 mAh (0.2 C) and the cutoff voltage $V_0$ is 3.7V. At 25° C., the maximum charge current of the anode at which no lithium precipitation occurs at the anode is 1.2 C and the lowest anode potential of the anode at which no lithium precipitation occurs at the anode is −20 mV.

Examples 29 to 35 and Comparative examples 9 to 10 each is charged at 25° C. Examples 29 to 35 each use the method for charging a lithium ion battery of the present invention, and Comparative example 9 to 10 each use a conventional method for charging a lithium ion battery at a constant current and voltage. Table 5 presents the relevant parameters of each Examples and Comparative examples.

TABLE 5

Comparison of charging parameters and charging effects of lithium ion batteries including $LiFePO_4$ and hard carbon in examples and comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 9 | / | / | / | / | 1.2 C | / | 0.05 C | No | 40.1 |
| Comparative example 10 | / | / | / | / | 1.8 C | / | 0.05 C | Yes | 32.7 |
| Example 29 | 1.5 C | 0.1 | 0.02 C | 0.01 | 1.2 C | 10 | 0.05 C | No | 35.3 |
| Example 30 | 1.8 C | 10 | 0.1 C | 0.2 | 1.2 C | 10 | 0.05 C | No | 33.0 |
| Example 31 | 1.5 C | 2 | 0.2 C | 0.05 | 1.2 C | 10 | 0.05 C | No | 35.8 |
| Example 32 | 1.5 C | 20 | 0.1 C | 2 | 1.2 C | 10 | 0.05 C | No | 36.4 |
| Example 33 | 1.8 C | 1 | 0.01 C | 0.1 | 1.2 C | 10 | 0.01 C | No | 32.9 |
| Example 34 | 1.8 C | 5 | 0 | 1 | 1.2 C | 1 | 0.1 C | No | 37.1 |
| Example 35 | 1.8 C | 3 | 0.1 C | 0.5 | 1.2 C | 30 | 0.05 C | No | 32.9 |

The lithium ion batteries of Examples 36 to 42 and Comparative examples 11 to 12 each includes a cathode of $LiFePO_4$ and an anode of MCMB. Each lithium ion battery also includes a separator, an electrolyte and a packaging case. Each lithium ion battery is prepared by assembling, forming and aging process. The cathode includes 95.4% of $LiFePO_4$ (as a cathode active material), 2% of PVDF (as a binder), and 2.6% of SP (as a conductive agent). The anode includes of 98% of MCMB (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3000 mAh (0.2 C) and the cutoff voltage $V_0$ is 3.7V. The maximum charge current of the anode at which no lithium precipitation occurs at the anode is 0.5 C and the lowest anode potential of the anode at which no lithium precipitation occurs at the anode is −20 mV.

Examples 36 to 42 and Comparative examples 11 to 12 each is charged at 25° C. Examples 36 to 42 each use the method for charging a lithium ion battery of the present invention, and Comparative example 11 to 12 each use a conventional method for charging a lithium ion battery at a constant current and voltage. Table 6 presents the relevant parameters of each Examples and Comparative examples.

TABLE 6

Comparison of charging parameters and charging effects of lithium ion batteries including $LiFePO_4$ and MCMB in examples and comparative examples

| | $I_1$ | $t_1$(s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 11 | / | / | / | / | 0.5 C | / | 0.05 C | No | 96.2 |
| Comparative example 12 | / | / | / | / | 0.8 C | / | 0.05 C | Yes | 60.1 |
| Example 36 | 0.7 C | 0.1 | 0.02 C | 0.01 | 0.5 C | 10 | 0.05 C | No | 67.3 |
| Example 37 | 0.7 C | 10 | 0.1 C | 0.2 | 0.5 C | 10 | 0.05 C | No | 69.5 |
| Example 38 | 1 C | 2 | 0.2 C | 0.05 | 0.5 C | 10 | 0.05 C | No | 58.3 |
| Example 39 | 0.7 C | 20 | 0.1 C | 2 | 0.5 C | 10 | 0.05 C | No | 70.2 |
| Example 40 | 1 C | 1 | 0.01 C | 0.1 | 0.5 C | 10 | 0.01 C | No | 55.6 |
| Example 41 | 1 C | 5 | 0 | 1 | 0.5 C | 1 | 0.1 C | No | 66.8 |
| Example 42 | 1 C | 3 | 0.1 C | 0.5 | 0.5 C | 30 | 0.05 C | No | 56.4 |

The lithium ion batteries of Examples 43 to 49 and Comparative examples 13 to 14 each includes a cathode of NCX (X=Mn, Al) and an anode of graphite. Each lithium ion battery also includes a separator, an electrolyte and a packaging case. Each lithium ion battery is prepared by assembling, forming and aging process. The cathode includes 96.4% of NCX (as a cathode active material), 1.8% of PVDF (as a binder), and 1.8% of SP (as a conductive agent). The anode includes 98% of graphite (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 3000 mAh (0.2 C) and the cutoff voltage $V_0$ is 4.2V. The maximum charge current of the anode at which no lithium precipitation occurs at the anode is 1 C and the lowest anode potential of the anode at which no lithium precipitation occurs at the anode is −40 mV.

Examples 43 to 49 and Comparative examples 13 to 14 each is charged at 25° C. Examples 43 to 49 each use the method for charging a lithium ion battery of the present invention, and Comparative example 13 to 14 each use a conventional method for charging a lithium ion battery at a constant current and voltage. Table 7 presents the relevant parameters of each Examples and Comparative examples.

TABLE 7

Comparison of charging parameters and charging effects of lithium ion batteries including NCX and graphite in Examples and Comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 13 | / | / | / | / | 1 C | / | 0.05 C | No | 48.2 |
| Comparative example 14 | / | / | / | / | 1.5 C | / | 0.05 C | Yes | 36.6 |
| Example 43 | 1.6 C | 0.1 | 0.02 C | 0.01 | 1 C | 10 | 0.05 C | No | 34.3 |
| Example 44 | 1.3 C | 10 | 0.1 C | 0.2 | 1 C | 10 | 0.05 C | No | 38.5 |
| Example 45 | 1.6 C | 2 | 0.2 C | 0.05 | 1 C | 10 | 0.05 C | No | 36.8 |

TABLE 7-continued

Comparison of charging parameters and charging effects of lithium ion batteries including NCX and graphite in Examples and Comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Example 46 | 1.3 C | 20 | 0.1 C | 2 | 1 C | 10 | 0.05 C | No | 39.2 |
| Example 47 | 1.3 C | 1 | 0.01 C | 0.1 | 1 C | 10 | 0.01 C | No | 37.8 |
| Example 48 | 1.6 C | 5 | 0 | 1 | 1 C | 1 | 0.1 C | No | 38.0 |
| Example 49 | 1.6 C | 3 | 0.1 C | 0.5 | 1 C | 30 | 0.05 C | No | 34.8 |

The lithium ion batteries of Examples 50 to 56 and Comparative examples 15 to 16 each includes a cathode of NCX (X=Mn, Al) and an anode of hard carbon. Each lithium ion battery also includes a separator, an electrolyte and a packaging case. Each lithium ion battery is prepared by assembling, forming and aging process. The cathode includes 96.4% of NCX (as a cathode active material), 1.8% of PVDF (as a binder), and 1.8% of SP (as a conductive agent). The anode includes 98% of graphite (as anode active material), 1.0% of SBR (as binder), and 1.0% of CMC (as thickener). The separator is a composite film of PP/PE/PP. The electrolyte includes organic solvent (30% EC+30% PC+40% DEC), 1 mol/L $LiPF_6$ and additives (0.5% VC, 5% FEC, 4% VEC).

At 25° C., the full charge capacity (SOC) of the lithium ion battery is 2900 mAh (0.2 C) and the cutoff voltage $V_0$ is 4.2V. The maximum charge current of the anode at which no lithium precipitation occurs at the anode is 1.5 C and the lowest anode potential of the anode at which no lithium precipitation occurs at the anode is −60 mV.

Examples 50 to 56 and Comparative examples 15 to 16 each is charged at 25° C. Examples 50 to 56 each use the method for charging a lithium ion battery of the present invention, and Comparative example 15 to 16 each use a conventional method for charging a lithium ion battery at a constant current and voltage. Table 8 presents the relevant parameters of each Examples and Comparative examples.

TABLE 8

Comparison of charging parameters and charging effects of lithium ion batteries including NCX and hard carbon in examples and comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 15 | / | / | / | / | 1.5 C | / | 0.05 C | No | 36.5 |
| Comparative example 16 | / | / | / | / | 2 C | / | 0.05 C | Yes | 31.6 |
| Example 50 | 1.8 C | 0.1 | 0.02 C | 0.01 | 1.5 C | 10 | 0.05 C | No | 32.8 |
| Example 51 | 1.8 C | 10 | 0.1 C | 0.2 | 1.5 C | 10 | 0.05 C | No | 33.5 |
| Example 52 | 2.2 C | 2 | 0.2 C | 0.05 | 1.5 C | 10 | 0.05 C | No | 30.6 |
| Example 53 | 1.8 C | 20 | 0.1 C | 2 | 1.5 C | 10 | 0.05 C | No | 33.0 |
| Example 54 | 1.8 C | 1 | 0.01 C | 0.1 | 1.5 C | 10 | 0.01 C | No | 32.5 |
| Example 55 | 2.2 C | 5 | 0 | 1 | 1.5 C | 1 | 0.1 C | No | 33.9 |
| Example 56 | 2.2 C | 3 | 0.1 C | 0.5 | 1.5 C | 30 | 0.05 C | No | 30.5 |

The lithium ion batteries of Examples 57 to 63 and Comparative examples 17 to 18 each includes a cathode of NCX (X=Mn, Al) and an anode of MCMB. Each lithium ion battery also includes a separator, an electrolyte and a packaging case. Each lithium ion battery is prepared by assembling, forming and aging process. The cathode includes 96.4% of NCX (as a cathode active material), 1.8% of PVDF (as a binder), and 1.8% of SP (as a conductive agent). The anode includes 98% of MCMB (as anode active material), 1.0% of SBR (as binder), and 1.0% of CMC (as thickener). The separator is a composite film of PP/PE/PP. The electrolyte includes organic solvent (30% PC+30% PC+40% DEC), 1 mol/L $LiPF_6$ and additives (0.5% VC, 5% FEC, 4% VEC).

At 25° C., the full charge capacity (SOC) of the lithium ion battery is 2950 mAh (0.2 C) and the cutoff voltage $V_0$ is 4.2V. At 25° C., the maximum charge current of the anode at which no lithium precipitation occurs at the anode is 0.8 C and the lowest anode potential of the anode at which no lithium precipitation occurs at the anode is −30 mV.

Examples 57 to 63 and Comparative examples 17 to 18 each is charged at 25° C. Examples 57 to 63 each use the method for charging a lithium ion battery of the present invention, and Comparative example 17 to 18 each use a conventional method for charging a lithium ion battery at a constant current and voltage. Table 9 presents the relevant parameters of each examples and comparative examples.

TABLE 9

Comparison of charging parameters and charging effects of lithium ion batteries including NCX and MCMB in examples and comparative examples

| | $I_1$ | $t_1$ (s) | $I_2$ | $t_2$ (s) | $I_0$ | $t_3$ (s) | $I_3$ | Whether lithium precipitation occurs at the anode | Charging time for reaching 80% SOC (min) |
|---|---|---|---|---|---|---|---|---|---|
| Comparative example 17 | / | / | / | / | 0.8 C | / | 0.05 C | No | 60.1 |
| Comparative example 18 | / | / | / | / | 1.2 C | / | 0.05 C | Yes | 40.3 |
| Example 57 | 1.5 C | 0.1 | 0.02 C | 0.01 | 0.8 C | 10 | 0.05 C | No | 38.2 |
| Example 58 | 1 C | 10 | 0.1 C | 0.2 | 0.8 C | 10 | 0.05 C | No | 48.8 |
| Example 59 | 1.5 C | 2 | 0.2 C | 0.05 | 0.8 C | 10 | 0.05 C | No | 38.5 |
| Example 60 | 1 C | 20 | 0.1 C | 2 | 0.8 C | 10 | 0.05 C | No | 49.7 |
| Example 61 | 1.5 C | 1 | 0.01 C | 0.1 | 0.8 C | 10 | 0.01 C | No | 37.4 |
| Example 62 | 1.5 C | 5 | 0 | 1 | 0.8 C | 1 | 0.1 C | No | 45.8 |
| Example 63 | 1.5 C | 3 | 0.1 C | 0.5 | 0.8 C | 30 | 0.05 C | No | 38.2 |

Figure 2:
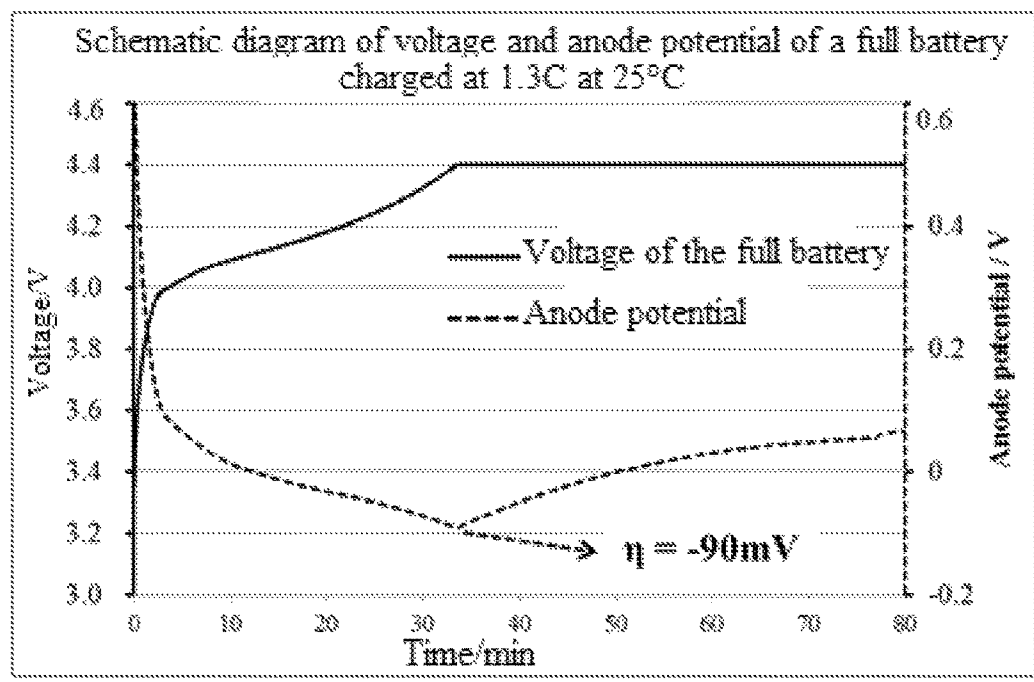
FIG. 2 depicts a schematic diagram of voltage and anode potential of a full battery in example 1 of the present invention having $LiCoO_2$ and graphite and charged at 1.3 C.

FIG. 2 depicts a schematic diagram of voltage and anode potential of a full battery according to Example 1 of the present invention including $LiCoO_2$ and graphite charged at 1.3 C. Referring to FIG. 2, the lowest anode potential η of the lithium ion battery at which no lithium precipitation occurs at the anode is about −90 mV. Tables 1 to 9 present the lithium precipitation and charging time for reaching 80% SOC in different examples and comparative examples. As can be seen, for a lithium ion battery charged at constant current and voltage according to the traditional method, if the charging current exceeds the maximum safe charging current the battery system can bear, lithium precipitation occurs at the anode. If the lithium ion battery is charged according to the method for charging a lithium ion battery of the present invention, lithium precipitation at the anode of the lithium ion battery can be effectively inhibited, so as to enhance the maximum safe charging current the lithium ion battery can bear. Accordingly, the method for charging a lithium ion battery of the present invention can increase the charging speed.

Figure 5:
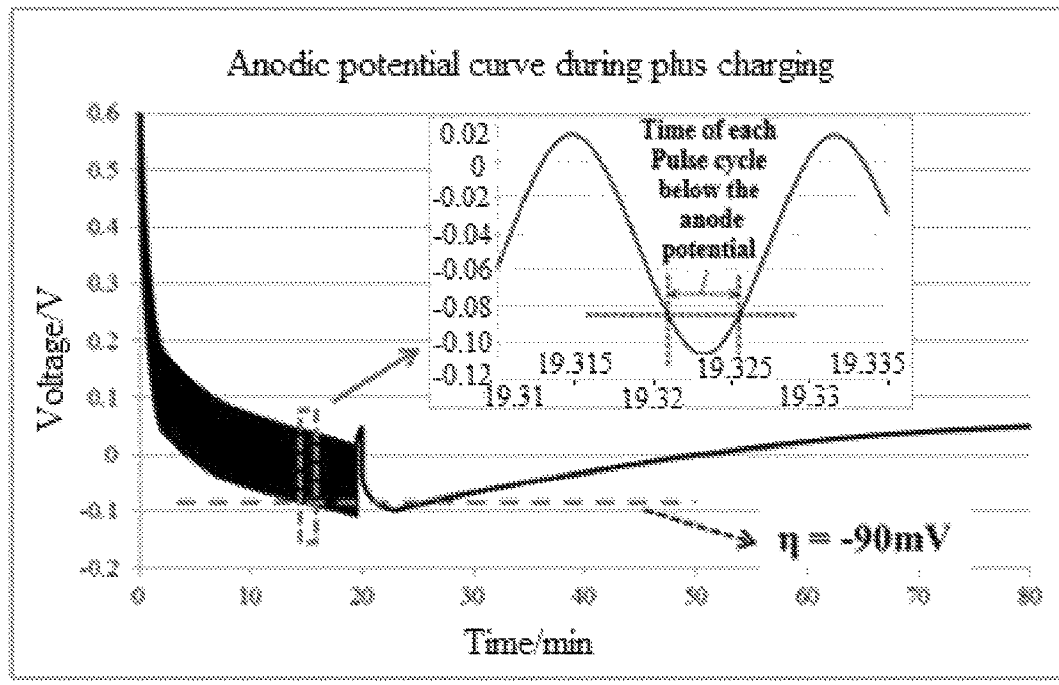
FIG. 5 depicts an anodic potential curve of example 1 at the time of charging.
Figure 6:
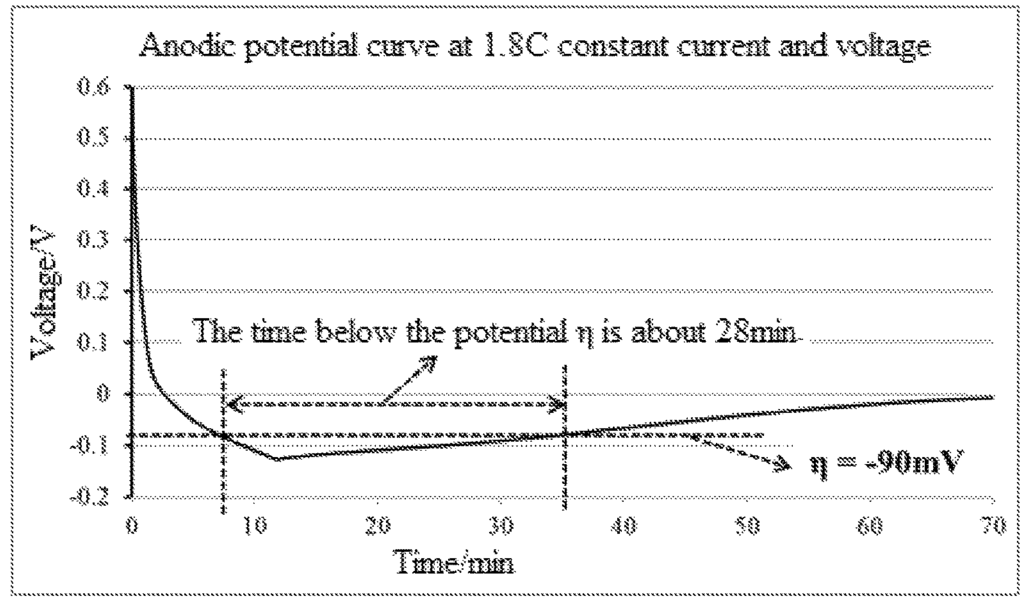
FIG. 6 depicts an anodic potential curve of comparative example 2 at the time of charging.

The improvement of the method for charging a lithium ion battery of the present invention can be explained in view of the anode potential of the charging process. FIG. 5 and FIG. 6 depict anodic potential curves of Example 1 and Comparative example 2 respectively. As can be seen from FIGS. 5 and 6, for a lithium ion battery charged at 1.8 C with a constant current and voltage, the time in which no lithium precipitation occurs below the lowest anode potential is about 28 min. At one hand, for a lithium ion battery charged according to the method for charging a lithium ion battery of the present invention, the time in which no lithium precipitation occurs below the lowest anode potential is remarkably shortened (about 0.5 min). At the other hand, in the method for charging a lithium ion battery of the present invention, the lithium ion battery is charged with a large current pulse and discharged with a small current pulse. Therefore, increase of the lithium ion concentration at the surface of the anode caused by the large current charging is reduced and occurrence of lithium precipitation at the anode is avoided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions describe example embodiments, it should be appreciated that alternative embodiments without departing from the scope of the appended claims. Although specific terms are employed herein, they are used in a generic and descriptive sense only and not for purposes of limitation.

What is claimed is:

1. A method for charging a lithium ion battery, comprising the steps of:

1) determining a maximum charging current $I_0$ and a lowest anode potential η of the lithium ion battery at which no lithium precipitation occurs;
2) charging the lithium ion battery at a constant current of $I_1$ which is greater than $I_0$ for a charging time of $t_1$;
3) discharging the lithium ion battery at a constant current of $I_2$ which is less than $I_0$ for a discharging time of $t_2$, wherein $5 \le t_1/t_2 \le 50$;
4) repeating steps 2) and 3) until a cutoff voltage of the lithium ion battery reaches $V_0$, and then standing the lithium ion battery for a standing time of $t_3$; and
5) charging the lithium ion battery with a constant current of $I_0$ until the cutoff voltage of the lithium ion battery reaches $V_0$ and then charging the lithium ion battery to a cutoff current of $I_3$ at a constant voltage.

2. The method for charging a lithium ion battery of claim 1, wherein in step 2), a current value of the constant current $I_1$ is 0.7 C to 3 C and the charging time $t_1$ is 0.1 s to 20 s.

3. The method for charging a lithium ion battery of claim 1, wherein in step 3), a current value of the constant current $I_2$ is 0 to 0.2 C and the discharging time $t_2$ is 0.01 s to 2 s.

4. The method for charging a lithium ion battery of claim 1, wherein in step 4), the standing time $t_3$ is 1 s to 10 s.

5. The method for charging a lithium ion battery of claim 1, wherein in step 5), a current value of the constant current $I_3$ is 0.01 C to 0.1 C.

6. The method for charging a lithium ion battery of claim 1, wherein the cutoff voltage $V_0$ satisfies $3.6V \le V_0 \le 4.5V$.

7. The method for charging a lithium ion battery of claim 1, wherein a cathode of the lithium ion battery is selected from a group consisting of $LiCoO_2$, $LiFePO_4$, $LiNiCoMn_xAl_{1-x}O_2$, wherein $0 \le x \le 1$; an anode of the lithium ion battery is selected from a group consisting of graphite, hard carbon, mesophase carbon microbeads; a maximum charge current $I_0$ of the anode at which no lithium precipitation occurs at the anode is 0.5 C to 2.0 C; and a lowest anode potential $\eta$ at which no lithium precipitation occurs at the anode is −5 mV to −100 mV.

8. The method for charging a lithium ion battery of claim 1, wherein the method is carried out at a temperature of 25±3° C.

* * * * *